United States Patent Office 3,230,904
Patented Jan. 25, 1966

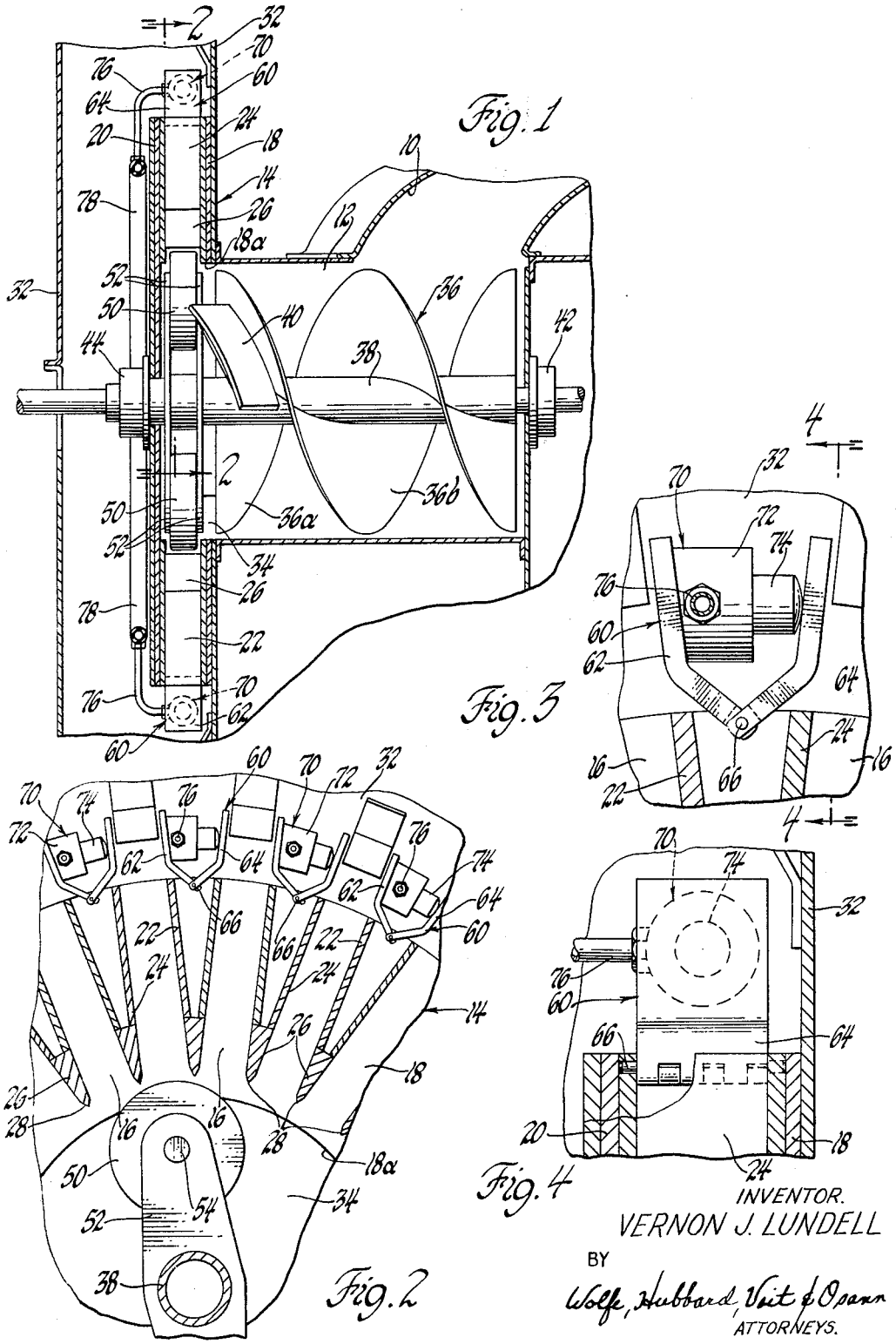

3,230,904
DENSITY CONTROL MECHANISM FOR FORAGE CROP WAFERING MACHINES
Vernon J. Lundell, Cherokee, Iowa, assignor to Massey-Ferguson Services N.V., Curacao, Netherlands Antilles, a corporation of Netherlands Antilles
Filed Sept. 15, 1964, Ser. No. 396,671
3 Claims. (Cl. 107—14)

The present invention relates generally to agricultural machines of the type intended primarily for treating forage crops and concerns more particularly an improved density control mechanism in machines for forming forage crop material into wafers.

Recently there have been developed machines of practical utility for converting forage crop material into relatively small, dense, and uniform blocks called wafers or pellets. These machines include means for chopping and commingling stems and leaves of the crop material and a wafering mechanism into which the commingled mass is delivered and by which it is compacted into wafer form. The wafering mechanism includes a series of die cells and means for compressing the crop material into and through the die cells so as to thereby form it into wafers.

Since the forage crop material to be compacted into wafers frequently varies considerably in moisture content and in the nature and ratio of stems and leaves, the density of the resulting wafers often varies considerably.

Accordingly, the primary aim of the present invention is to provide an improved density control mechanism for a forage wafering machine which includes means for automatically and simultaneously controlling the density and compaction characteristics of forage crop wafers produced by the machine.

It is a more particular object to provide means movable externally of each of the die cells of the wafering mechanism for controlling the density of the forage crop material being extruded through each of the die cells.

It is a related object to provide a mechanism of the above type wherein the density control mechanism for each of the die cells can be readily replaced or serviced without necessitating removal of the individual die cell structures.

It is also an object of the invention to provide a density control mechanism that is extremly simple in its construction and operation and which insure long and trouble free operation.

Other objects and advantages of the invention will become apparent upon reading the following detailed description and upon reference to the drawings in which:

FIGURE 1 is a fragmentary transverse vertical section of a wafering mechanism and means for transferring crop material into the same;

FIG. 2 is an enlarged partial sectional view taken substantially in the plane indicated by line 2—2 in FIG. 1;

FIG. 3 is a still further enlarged fragmentary sectional view of a portion of the apparatus shown in FIG. 2 with certain portions broken away to better illustrate the density control apparatus; and FIG. 4 is a fragmentary sectional view also on an enlarged scale taken substantially in the plane indicated by the line 4—4 in FIG. 3.

While the invention will be described in connection with certain preferred embodiments, it will be understood that I do not intend to limit the invention to those embodiments. On the contrary, I intend to cover all alternatives, modifications and equivalents as may be included within the spirit and scope of the invention as defined by the appended claims.

Wafering machines of the type here concerned conventionally include means for receiving, chopping and commingling forage crop material and delivering it to the wafering mechanism. Such a receiving and chopping means has not been illustrated in the accompanying drawings. Suffice it to say, however, this means delivers the chopped and commingled leaves and stems by way of a chute 10 into a hopper 12 from which it is delivered into a wafering mechanism, generally indicated at 14. The wafering mechanism 14 includes means defining a series of die cells 16 and the forage crop material is delivered into juxtaposition with respect to the entrance of the die cells and is continuously forced into the die cells so that the forage crop material is formed into pressed masses within the cells. As more and more of the crop material is formed into the die cells, the material compressed within the cells is caused to extend beyond the exit ends of the die cells where it is separated into substantially predetermined lengths comprising the formed wafers.

In the illustrative device, the means defining the die cells 16 of the wafering mechanism 14 includes side plates 18 and 20 and transverse partitions 22 and 24. As shown, the side plates 18, 20 are disposed in spaced parallel relation to each other and the partitions 22 and 24 are interposed between the spaced side plates which are maintained in such relation by any suitable means, such as by bolts (not shown). Thus, the inner faces of the side plates 18, 20 define the transverse walls of the die cells 16 and the inner faces of the partitions 22, 24 define the longitudinal walls of the die cells.

At the entrance ends of the die cells 16, the longitudinal cell walls are defined by tips 26. The tips are preferably formed of hardened steel with their inner ends defining knife-like edges 28 and with outwardly diverging longitudinal faces which terminate at their outer ends adjacent the partitions 22, 24. Outwardly of the tip 26, the partitions 22 and 24 are arranged in oppositely facing pairs, disposed in back-to-back relation to one another between adjacent die cells 16. The back-to-back partitions 22 and 24 are also disposed to converge inwardly from adjacent the exit ends of the die cells toward the entrance ends.

In the illustrative wafering mechanism 14, the die cells are radially disposed in an annular arrangement with their inner or entrance ends defining the inner periphery of the annulus and their exit ends defining the outer periphery thereof. The wafering mechanism 14 is disposed within a housing 32 which not only encloses the mechanism but also serves to receive the wafers of forage crop material formed by the wafering mechanism. The space within the inner periphery of the annulus of die cells comprises an extruder-feed chamber 34.

The loose mass of chopped forage crop material is transferred from the hopper 12 into the extruder-feed chamber 34. An access opening 18a is formed in the right sidewall of the housing 32 and the side plate 18 thereby providing communication between the hopper 12 and the extruder-feed chamber 34.

For conveying the crop material from the hopper 12 through the opening 18a, the illustrative machine includes an auger type conveyor 36. As shown, the conveyor 36 is composed of two helical flights 36a and 36b which are rigid with a shaft 38. The terminal faces of the auger flight are equipped with vanes 40 which are of arcuate form and extend into the extruder-feed chamber 34 to insure delivery of the crop material into proximate juxtaposition adjacent the entrance ends of the die cells 16. The right end of the shaft 38 is journalled in a bearing 42 which is mounted on the right end wall of the hopper 12 as shown in FIG. 1. The shaft 38 extends through the hopper 12 and coaxially through the extruder-feed chamber 34 and is journalled at its left end in the bearing 44 mounted on the outer end wall 20 of the wafering mechanism 14 which closes that side of the extruder-feed chamber.

Preferably, the conveyor 36 is rotated at a relatively high speed so as not only to transfer the chopped crop material received in the hopper 12 into the extruder-feed chamber 34, but in so doing to impart thereto a whirling motion so that the crop material is distributed, centrifugally, about the periphery of the extruder-feed chamber over the entrance ends of the die cells 16.

The crop material that is disposed about the extruder-feed chamber 34 is then pressed into the die cells 16 and against the knife edges 28 to sever the crop material that is forced into adjacent die cells. For this purpose, the exemplary wafering mechanism 14 utilizes a pair of rollers 50 of substantial mass. The rollers are carried by a frame which includes a pair of diametrically extending arms 52 disposed within the extruder-feed chamber 34. Each of the rollers 50, as shown in FIG. 2, is of annular form and is journalled upon a stub shaft 54 mounted between the outer ends of the arms 52. Thus, the rollers are so located that the peripheral surfaces of the rollers traverse a path close to but spaced slightly from the periphery of the extruder-feed chamber 34 as defined by the entrance ends of the die cells 16 determined by the knife edges 28.

In accordance with the present invention, provision is made for varying the degree of compaction with which the forage material is compressed into wafers within the die cells 16. To this end, a density control mechanism, indicated generally at 60 is located outwardly and between each of the back-to-back partitions 22, 24. As best seen in FIGS. 2–4, the density control mechanism 60 includes a pair of face plates 62 and 64 which are hinged at their inner ends on a pivot pin 66 journalled in the side plates 18, 20 between the partitions 22, 24. Preferably, each of the face plates 62, 62 is formed with a slightly angled configuration so that the outer portion of each of the plates 62, 64 extends outwardly and generally aligned with respect to the corresponding partitions 22, 24.

For controlling the density of the compressed wafers, each of the face plates 62, 64 is movable into the path of the forage crop material being compressed in and extruded through the die cells 16. Thus, by projecting into the path of the material, the plates 62, 64 increase the resistance that the forage crop material encounters in passing through the die cells and accordingly the forage material is compressed to a greater degree in order to overcome this increased resistance.

To operate each of the improved density control mechanisms 60, individual hydraulic actuators 70 are provided. As shown in the drawings, the actuators 70 are disposed outwardly of the die cells and are mounted between the back-to-back face plates 62, 62. It will be understood that each actuator 70 includes a piston (not shown) operable within a cylinder 72 secured to face plate 62 and an operating rod 74 which is coupled directly to the piston so as to project from the cylinder and abut the other face plate 64.

To simultaneously control all of the actuators 70, and thus the density of the forage material being compressed in the die cells 16, the actuators are all connected to a common source of hydraulic pressure fluid. As best seen in FIG. 1, each of the actuators 70 is provided with a supply line 76. The supply lines 76, in turn, are all coupled to a ring-type manifold 78 which is supplied with hydraulic fluid at a controlled presure by a suitable pump and valve mechanism (not shown). Therefore, since the hydraulic pressure in each of the actuators 70 is the same, the force exerted on the density control members 62, 64 is also identical and, accordingly, forage crop wafers of uniform density are extruded through all of the die cells 16. The density of the wafers, of course, can be changed simply by altering the hydraulic pressure in the manifold 78.

From the foregoing, it will be appreciated that the density control mechanisms 60 provided by the present invention afford a simple, yet effective mechanism for regulating the degree of compaction with which the forage crop material is compressed into wafers within the individual die cells 16. It will also be seen that by using simple and easily formed parts the density control mechanism can be economically and efficiently manufactured. In addition, when the density control face plates 62, 64 become worn through continued use, they can be conveniently replaced without necessitating the replacement of the entire die cell structures. Moreover, by locating the density control mechanisms outwardly of the die cells and between the back-to-back partitions, they are readily accessible for servicing and maintenance, when necessary, and yet, the hinge pin 66 is shielded from the undesirable accumulation of crop material.

I claim as my invention:

1. For use in a forage wafering mechanism including means defining at least a pair of adjacent die cells having entrance ends and exit ends and means for compressing forage crop material into the entrance ends and out through the exit ends of said die cells to compact said material into wafers, the combination comprising, a pair of members hinged about a common pivot at their inner ends between said adjacent die cells and extending outwardly adjacent the exit ends of said die cells substantially parallel to the path of travel of said material through said die cells, and means for rocking said members about said pivot and into the path of travel of said material emerging through the exit ends of said die cells as a control of the degree of compaction with which said forage crop material is compressed into wafers within said die cells.

2. The combination defined in claim 1 wherein one of said members of said pair mounts a hydraulic cylinder having a plunger engageable with the other member of said pair and means are provided for supplying pressure fluid to said cylinder to rock said members about said common pivot.

3. The combination defined in claim 1 wherein said die cells are arranged in an annular array about said compressing means and each of said die cells is defined by a pair of substantially parallel, circumferentially spaced walls and a pair of substantially parallel, axially spaced walls, said circumferentially spaced walls between adjacent die cells being arranged in back-to-back relation and disposed in inwardly converging relation to one another with said pair of members freely movable about said common pivot so that one of said members may extend farther into the path of travel of said forage material adjacent the exit end of one of said die cells as said other member retracts out of the path of travel of said forage material adjacent the exit end of the adjacent die cell as the degree of compaction with which said forage crop material is compressed into wafers within said adjacent die cells varies.

References Cited by the Examiner
UNITED STATES PATENTS

| 3,134,344 | 5/1964 | Lundell | 107—14 |
|---|---|---|---|
| 3,153,889 | 10/1964 | Peterson | 56—1 |
| 3,166,026 | 1/1965 | Crane | 107—14 |
| 3,174,441 | 3/1965 | Lundell | 107—14 |

WALTER A. SCHEEL, *Primary Examiner.*